(12) United States Patent
Shimizu et al.

(10) Patent No.: US 8,027,012 B2
(45) Date of Patent: Sep. 27, 2011

(54) LIQUID CRYSTAL DISPLAY PANEL COMPRISING AN ARRAY GLASS SUBSTRATE AND AN OPPOSING GLASS SUBSTRATE WITH A LIQUID CRYSTAL FILLER

(75) Inventors: Tomoyuki Shimizu, Chiyoda-ku (JP); Junichiro Kase, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 99 days.

(21) Appl. No.: 12/338,103

(22) Filed: Dec. 18, 2008

(65) Prior Publication Data

US 2009/0103040 A1 Apr. 23, 2009

Related U.S. Application Data

(63) Continuation of application No. PCT/JP2007/060162, filed on May 17, 2007.

(30) Foreign Application Priority Data

Jun. 30, 2006 (JP) ................. 2006-181342

(51) Int. Cl.
*G02F 1/1333* (2006.01)
*C03C 3/087* (2006.01)
(52) U.S. Cl. ......................... 349/158; 501/70
(58) Field of Classification Search ............ 501/70; 349/158
See application file for complete search history.

(56) References Cited

U.S. PATENT DOCUMENTS

| 6,525,799 | B1 * | 2/2003 | Fukuda ............ 349/157 |
| 2005/0209084 | A1 * | 9/2005 | Takaya et al. ............ 501/11 |
| 2009/0325778 | A1 * | 12/2009 | El Khiati et al. ............ 501/70 |

FOREIGN PATENT DOCUMENTS

| CN | 1111215 A | 11/1995 |
| CN | 1297219 A | 5/2001 |
| JP | 9169539 A | 6/1997 |
| JP | 2000302474 A | 10/2000 |
| JP | 2002350816 A | 12/2002 |
| JP | 2006137631 A | 6/2006 |
| JP | 2006169107 A | 6/2006 |

* cited by examiner

*Primary Examiner* — Nathanael R Briggs
(74) *Attorney, Agent, or Firm* — Oblon, Spivak, McClelland, Maier & Neustadt, L.L.P.

(57) ABSTRACT

To provide a liquid crystal display panel which can be produced at low cost by using inexpensive alkali glass for at least an opposing glass substrate, which is free from troubles in a liquid crystal display due to panel warpage attributable to the thermal treatment since such treatment is not required in the production process, and further which is free from panel warpage which tends to bring a trouble in a liquid crystal display derived from the difference in the thermal expansion coefficient by change in ambient temperature at the time of use.

A liquid crystal display panel comprising an array glass substrate and an opposing glass substrate facing it, in which a liquid crystal is filled between such substrates, and an ultraviolet curable resin is sealed at a peripheral area,
wherein the above opposing glass substrate is an alkali glass substrate, and
the difference in thermal expansion coefficient between the above array glass substrate and the above opposing glass substrate is at most $35 \times 10^{-7}$/° C.

13 Claims, 1 Drawing Sheet

LIQUID CRYSTAL DISPLAY PANEL COMPRISING AN ARRAY GLASS SUBSTRATE AND AN OPPOSING GLASS SUBSTRATE WITH A LIQUID CRYSTAL FILLER

TECHNICAL FIELD

The present invention relates to a liquid crystal display panel.

BACKGROUND ART

Heretofore, TFT-LCD which is operated by a thin film transistor (TFT) has been used for a liquid crystal display panel, and a glass substrate for the TFT-LCD is required to have e.g. chemical durability or heat resistance durable against chemicals or heat treatment to is be used in a TFT-forming step. Further, if an alkali metal oxide is contained in the glass substrate, alkali ions in the glass substrate are likely to diffuse into a semiconductor film during the thermal treatment thereby to deteriorate film properties, and therefore the glass substrate is required to contain no alkali metal oxide, namely, to be alkali-free glass.

However, alkali-free glass has a very high viscosity and is difficult to melt, and it has therefore technical difficulties in its production. Further, its production cost tends to be high, and therefore it has been desired to develop a liquid crystal panel employing alkali glass instead of alkali-free glass.

In relation to such development, Patent Document 1 discloses a glass substrate characterized to be used as a glass substrate for a liquid crystal display, made of a glass having a strain point of from 530 to 630° C., a temperature corresponding to $10^{2.5}$ dPa·s of from 1370 to 1520° C. and a viscosity at a liquid-phase temperature of at least 100,000 poise, wherein the light transmitting surface is a non-polished surface, and the glass contains, as represented by mass %, from 50 to 70% of $SiO_2$, from 1 to 20% of $Al_2O_3$, from 0 to 15% of $B_2O_3$, from 1 to 25% of alkali metal oxide and from 0 to 30% of alkaline-earth metal oxide. Further, Patent Document 1 discloses a process for producing a glass substrate by forming the glass substrate by a down-draw process.

Further, it is disclosed that even when such an alkali glass substrate is used, if the production temperature (maximum temperature) of TFT is lowered from conventional temperature of about 350 to 400° C., to about 250 to 300° C., it is possible to suppress the diffusion of alkali ions into a semiconductor film, and it is thereby possible to use the alkali glass substrate as a substrate for liquid crystal displays.

If an alkali glass substrate obtained by such a process can be used as an array substrate or an opposing substrate for liquid crystal display panels, it is possible to lower a production cost as compared with a case where alkali-free glass is used, such being preferred.

Further, Patent Document 2 discloses a liquid crystal display device comprising an array substrate having a pixel electrode and a switching active component for operating the pixel electrode formed thereon, and an opposing substrate having an opposing electrode to the above pixel electrode formed on a color filter, wherein a liquid crystal is interposed between the above array substrate and the above opposing substrate, a peripheral area thereof is sealed with a UV-curable sealing material, the thermal expansion coefficient between the above array substrate and the above opposing substrate is different, and its difference is at most $50 \times 10^{-7}$/K. Further, Patent Document 2 discloses the above liquid crystal display device employing alkali-free glass for the above array substrate and soda lime glass for the above opposing substrate. Further, it also discloses that soda lime glass is unsuitable for the above array substrate and is used for the above opposing substrate only.

Further, specifically, aluminoborosilicate glass having a thermal expansion coefficient of $38 \times 10^{-7}$/K, aluminosilicate glass of $43 \times 10^{-7}$/K or bariumborosilicate glass of $46 \times 10^{-7}$/K is disclosed as the alkali-free glass, and soda lime glass having a thermal expansion coefficient of $84 \times 10^{-7}$/K is disclosed as the soda lime glass. Namely, there is a disclosure of liquid crystal display device in which the difference of the thermal expansion coefficient between the above array substrate and the above opposing substrate is $46 \times 10^{-7}$/K, $41 \times 10^{-7}$/K or $38 \times 10^{-7}$/K. Further, it discloses that it is possible to produce such a liquid crystal display device in such a manner that a UV-curable sealing material is applied on each of the above array substrate and the above opposing substrate, an optimum amount of a liquid crystal is dropped so as to form a specific gap, and both substrates are bonded with each other in vacuum, followed by irradiating them with ultraviolet ray to carry out curing and fixing.

Further, Patent Document 2 discloses that an inexpensive glass substrate is used for such a liquid crystal display device thereby to cut down costs, further sealing and curing can be carried out not by heating but by UV irradiation in a panel production step, and the difference in the thermal expansion coefficient is at most $50 \times 10^{-7}$/K, whereby it is possible to prevent warpage of a liquid crystal panel due to heating.

Patent Document 1: JP-A-2006-137631
Patent Document 2: JP-A-2002-350816

DISCLOSURE OF THE INVENTION

Problems to be Solved by the Invention

However, even in a case of a liquid crystal display device in which the difference in the thermal expansion coefficient between the above array substrate and the above opposing substrate, as disclosed in Patent Document 2, was at most $50 \times 10^{-7}$/K, the change in ambient temperature at the time of use was likely to bring about e.g. panel warpage due to the difference in the thermal expansion coefficient between the above array substrate and the above opposing substrate, whereby there was a case where troubles in a liquid crystal display tend to occur.

Means of Solving the Problems

The present inventors have conducted extensive studies to solve the above problems, and as a result, have found a liquid crystal display panel as shown below and thus have accomplished the present invention.

The present invention provides the following (1) to (5).

(1) A liquid crystal display panel comprising an array glass substrate and an opposing glass substrate facing it, in which a liquid crystal is filled between such substrates, and an ultraviolet curable resin is sealed at a peripheral area, wherein the above opposing glass substrate is an alkali glass substrate, and
the difference in thermal expansion coefficient between the above array glass substrate and the above opposing glass substrate is at most $35 \times 10^{-7}$/° C.

(2) The liquid crystal display panel according to the above (1), wherein the above difference in thermal expansion coefficient is at most $20 \times 10^{-7}$/° C.

(3) The liquid crystal display panel according to the above (1) or (2), wherein the array glass substrate has a thermal expansion coefficient of from $30\times10^{-7}/°$ C. to $80\times10^{-7}/°$ C., and its composition consists essentially of, as represented by mass % based on oxide, from 39 to 70% of $SiO_2$, from 3 to 25% of $Al_2O_3$, from 1 to 20% of $B_2O_3$, from 0 to 10% of MgO, from 0 to 17% of CaO, from 0 to 20% of SrO and from 0 to 30% of BaO; and the opposing glass substrate has a thermal expansion coefficient of from $50\times10^{-7}/°$ C. to $100\times10^{-7}/°$ C., and its composition consists essentially of, as represented by mass % based on oxide, from 50 to 84% of $SiO_2$, from 0 to 20% of $Al_2O_3$, from 5 to 25% of MgO+CaO and from 1 to 25% of $Na_2O+K_2O$.

(4) The liquid crystal display panel according to the above (1) or (2), wherein the array glass substrate has a thermal expansion coefficient of from $75\times10^{-7}/°$ C. to $95\times10^{-7}/°$ C. and a strain point of at least 530° C., and its composition consists essentially of, as represented by mass % based on oxide, from 50 to 75% of $SiO_2$, from 0 to 15% of $Al_2O_3$, from 6 to 24% of MgO+CaO+SrO+BaO and from 6 to 24% of $Na_2O+K_2O$; and the opposing glass substrate has a thermal expansion coefficient of from $50\times10^{-7}/°$ C. to $100\times10^{-7}/°$ C., and its composition consists essentially of, as represented by mass % based on oxide, from 50 to 84% of $SiO_2$, from 0 to 20% of $Al_2O_3$, from 5 to 25% of MgO+CaO and from 1 to 25% of $Na_2O+K_2O$.

(5) The liquid crystal display panel according to the above (1) or (2), wherein the array glass substrate and the opposing glass substrate are glass substrates having the same composition, the glass substrates have a thermal expansion coefficient of from $75\times10^{-7}/°$ C. to $95\times10^{-7}/°$ C. and the strain point of at least 530° C., the temperature ($T_4$) of glass melt at which the viscosity $\eta$ satisfies $\log\eta=4$ is $T_4 \leq 1200°$ C., and its composition consists essentially of, as represented by mass % based on oxide, from 50 to 75% of $SiO_2$, from 0 to 15% of $Al_2O_3$, from 6 to 24% of MgO+CaO+SrO+BaO and from 6 to 24% of $Na_2O+K_2O$.

Here, in the present invention, the expression "essentially" with respect to the composition means that no other components are contained except for unavoidable impurities included from e.g. starting materials. The same applies hereinafter.

EFFECT OF THE INVENTION

It is possible to produce the liquid crystal display panel of the present invention at low cost since inexpensive alkali glass is used for at least a glass substrate for an opposing substrate.

Further, it is not necessary to carry out heat treatment during or after the step of laminating an array substrate with an opposing substrate by an ultraviolet curable resin, and therefore there will be no troubles in a liquid crystal display due to panel warpage caused by such heat treatment.

Further, since the difference in thermal expansion coefficient between the above array glass substrate and the above opposing glass substrate is at most $35\times10^{-7}/°$ C., there will be no panel warpage leading to troubles in a liquid crystal display, attributable to the difference in the thermal expansion coefficient, due to the change of an ambient temperature.

MEANINGS OF REFERENCE SYMBOLS

Figure 1:
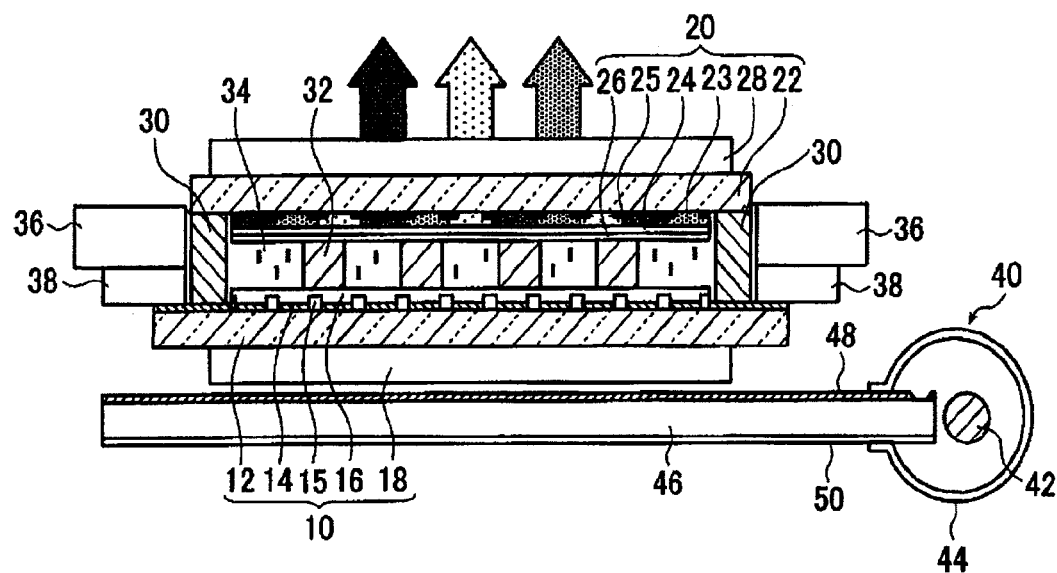
FIG. 1 is a schematic cross sectional view showing one embodiment of the liquid crystal display panel of the present invention.

| | |
|---|---|
| 10: | Array substrate |
| 12: | Array glass substrate |
| 14: | Transparent electrode |
| 15: | Active component |
| 16: | Alignment film |
| 18: | Polarizing plate |
| 20: | Opposing substrate |
| 22: | Opposing glass substrate |
| 23: | Colored film |
| 24: | Transparent electrode |
| 25: | Light-shielding film |
| 26: | Alignment film |
| 28: | Analyzing plate |
| 30: | Sealing material |
| 32: | Spacer material |
| 34: | Liquid crystal |
| 36: | Driving circuit |
| 38: | Driving circuit substrate |
| 40: | Lighting device |
| 42: | Light source |
| 44: | Light source cover |
| 46: | Light guide plate |
| 48: | Light diffusion plate |
| 50: | Reflection plate |
| 60: | Lower fixed plate |
| 62: | Upper fixed plate |
| 64: | Vacuum chamber |
| 66: | Vacuum pump |

BEST MODE FOR CARRYING OUT THE INVENTION

Now, the present invention will be described.

The present invention relates to a liquid crystal display panel comprising an array glass substrate, an opposing glass substrate opposing thereto, a liquid crystal filled between such substrates, and an ultraviolet curable resin sealing a peripheral area, wherein the above opposing glass substrate is an alkali glass substrate, and the difference in thermal expansion coefficient between the above array glass substrate and the above opposing glass substrate is at most $35\times10^{-7}/°$ C.

Firstly, the array glass substrate and the opposing glass substrate in the liquid crystal display panel of the present invention will be described.

In the present invention, the opposing glass substrate is an alkali glass substrate.

Here, "alkali glass" means a glass substantially containing an alkali metal element.

Further, "substantially containing" means that the alkali metal element is contained in an amount larger than the amount of unavoidable impurities included from e.g. starting materials. Namely, such an expression means that the alkali metal element is intentionally incorporated.

Such an alkali glass substrate may, for example, be conventional soda lime glass.

Whereas, the array glass substrate may be an alkali glass substrate like the above opposing glass substrate, or may be an alkali-free glass substrate.

Here, "alkali-free glass" means glass substantially containing no alkali metal element. Further, "substantially containing no" means that glass contains no element other than unavoidable impurities included from e.g. starting materials. Namely, such an expression means that the alkali metal element is not intentionally incorporated.

Further, in the present invention, the difference in thermal expansion coefficient between the above array glass substrate and the above opposing glass substrate is at most $35 \times 10^{-7}/°$C.

The difference in thermal expansion coefficient is preferably at most $30 \times 10^{-7}/°$C., more preferably at most $25 \times 10^{-7}/°$C., furthermore preferably at most $20 \times 10^{-7}/°$C.

The reason is such that in a case where the difference in thermal expansion coefficient is within such a range, there will be no panel warpage leading to troubles in a liquid crystal display, attributable to the difference between the respective thermal expansion coefficients of the above array glass substrate and the above opposing glass substrate even when the ambient temperature is changed at the time of using the liquid crystal display panel of the present invention.

Further, such a difference in thermal expansion coefficient is preferably at least $10 \times 10^{-7}/°$C. in a case where the array glass substrate is made of an alkali-free glass substrate and the opposing glass substrate is made of an alkali glass substrate.

The correlativity between the thermal expansion coefficient and the specific gravity in an alkali-free glass substrate is high, and for example the specific gravity is at least 3.0 when the thermal expansion coefficient is at least $65 \times 10^{-7}/°$C., such being undesirable from the viewpoint of weight reduction of a display. From this viewpoint, the thermal expansion coefficient of an alkali-free glass substrate is preferably low, particular preferably at most $55 \times 10^{-7}/°$C.

On the other hand, the thermal expansion coefficient of the alkali glass substrate has high correlativity with the glass viscosity as an index for easiness of melting/forming, and for example, $T_4$ becomes at least $1,250°$C. in the case of e.g. at most $60 \times 10^{-7}/°$C., such being undesirable with a view to providing an inexpensive glass substrate. From this viewpoint, the thermal expansion coefficient of the alkali glass substrate is preferably high, particularly preferably at least $65 \times 10^{-7}/°$C.

With a view to satisfying both the weight reduction of a display and providing of an inexpensive glass substrate, the difference in the thermal expansion coefficient is preferably at least $10 \times 10^{-7}/°$C., more preferably at least $15 \times 10^{-7}/°$C.

Further, the thermal expansion coefficient in the present invention represents a linear expansion coefficient at a temperature of from 50 to $350°$C., and means a value obtained by measurement employing a differential thermal dilatometer (TMA).

In the present invention, the forms (size, thickness, etc.) of the above array glass substrate and the above opposing glass substrate are not particularly limited. For example, it is possible to use a substrate which can be used for a known liquid crystal display panel. For example, a rectangular substrate with one side having a length of about 200 to 3,000 mm as a size may be mentioned. Further, one having a thickness of about 0.3 to 1.1 mm may be mentioned.

Thus, the liquid crystal display panel of the present invention comprises an alkali glass substrate as the opposing glass substrate and an alkali glass substrate or an alkali-free glass substrate as the array glass substrate, wherein the difference in thermal expansion coefficient between such glass substrates is within the is above range.

In such a liquid crystal display panel of the present invention, it is preferred that the above array glass substrate is made of specific alkali-free glass or alkali glass, and further the above opposing glass substrate is made of specific alkali glass.

Specifically, any one of the following first to third embodiments is preferred.

The first embodiment is a case where the above array glass substrate is made of specific alkali-free glass, and further the above opposing glass substrate is made of specific alkali glass. The liquid crystal display panel of the present invention having the above array glass substrate and the above opposing glass substrate will be hereinafter referred to as the liquid crystal display panel of the first embodiment of the present invention.

The second embodiment is a case where the above array glass substrate is made of specific alkali glass and further the above opposing glass substrate is made of specific alkali glass, and the respective glass substrates of the above array glass substrate and the above opposing glass substrate have different compositions. The liquid crystal display panel of the present invention having the above array glass substrate and the above opposing glass substrate will be hereinafter referred to as the liquid crystal display panel of the second embodiment of the present invention.

The third embodiment is a case where the above array glass substrate and the above opposing glass substrate are made of specific alkali glass having the same composition. The liquid crystal panel of the present invention having the above array glass substrate and the above opposing glass substrate will be hereinafter referred to as the liquid crystal display panel of the third embodiment of the present invention.

Now, the first to third embodiments will be described.

The liquid crystal display panel of the first embodiment of the present invention will be described.

In the liquid crystal display panel of the first embodiment of the present invention, the above array glass substrate is an alkali-free glass substrate as shown below, and further the above opposing glass substrate is an alkali glass substrate as shown below.

The above array glass substrate in the first embodiment has a thermal expansion coefficient of from $30 \times 10^{-7}$ to $80 \times 10^{-7}/°$C., preferably from $30 \times 10^{-7}$ to $65 \times 10^{-7}/°$C., more preferably from $35 \times 10^{-7}$ to $55 \times 10^{-7}/°$C.

The array glass substrate in the first embodiment essentially contains $SiO_2$ of from 39 to 70%, preferably from 45 to 70%, more preferably from 51 to 64%, based on oxides.

Further, $Al_2O_3$ is contained in an amount of from 3 to 25%, preferably 5 to 25%, more preferably from 10 to 22%.

Further, $B_2O_3$ is contained in an amount of from 1 to 20%, preferably from 6 to 12%.

Further, MgO is contained in an amount of from 0 to 10%, preferably from 1 to 7%.

Further, CaO is contained in an amount of from 0 to 17%, preferably from 2 to 14%.

Further, SrO is contained in an amount of from 0 to 20%, preferably from 0 to 15%, more preferably from 0.5 to 10%.

Further, BaO is contained in an amount of from 0 to 30%, preferably from 0 to 20%, more preferably from 0 to 1%.

Here, "%" means "mass%". The same applies hereinafter unless otherwise specified.

Further, the alkali-free glass substrate of the array glass substrate in the first embodiment has a strain point of preferably at least $560°$C., more preferably at least $600°$C., furthermore preferably at least $630°$C. When the strain point has such a temperature, it is possible to suppress the dimensional change due to glass thermal shrinkage in a production step of a TFT array to such an extent that no practical problems occur, and it is thereby possible to carry out the production without any substantial changes from the current production step of the TFT array.

Further, in the present invention, the strain point means a value obtained by measurement in accordance with JIS R3103.

Further, the thermal expansion coefficient of the above opposing glass substrate in the first embodiment is from $50\times10^{-7}$ to $100\times10^{-7}/°$ C., preferably from $50\times10^{-7}$ to $80\times10^{-7}/°$ C., more preferably from $60\times10^{-7}$ to $70\times10^{-7}/°$ C.

The opposing glass substrate in the first embodiment essentially contains $SiO_2$ of from 50 to 84%, preferably from 60 to 84%, more preferably from 64 to 80%, based on oxide.

Further, $Al_2O_3$ is contained in an amount of from 0 to 20%, preferably from 0 to 15%.

Further, the total content of MgO and CaO (namely, MgO+CaO) is from 5 to 25%, preferably from 8 to 18%.

Further, the total content of $Na_2O$ and $K_2O$ (namely, $Na_2O+K_2O$) is from 1 to 25%, preferably from 1 to 13%, more preferably from 2 to 10%.

Further, MgO is contained in an amount of preferably from 0 to 15%, more preferably from 0 to 10%.

Further, CaO is contained in an amount of preferably from 5 to 25%, more preferably from 10 to 20%.

Further, $Na_2O$ is contained in an amount of preferably from 1 to 12%, more preferably from 2 to 7%.

Further, $K_2O$ is contained in an amount of preferably from 0 to 8%, more preferably from 0 to 4%.

Such a preferred opposing glass substrate of the first embodiment may be an alkali glass substrate, which has a thermal expansion coefficient of from $50\times10^{-7}$ to $80\times10^{-7}/°$ C., and its composition consists essentially of, as represented by mass % based on oxide, from 60 to 84% of $SiO_2$, from 0 to 20% of $Al_2O_3$, from 0 to 15% of MgO, from 5 to 25% of CaO, from 1 to 12% of $Na_2O$, from 0 to 8% of $K_2O$ and from 1 to 13% of $Na_2O+K_2O$. In such a glass substrate, the content of an alkali component is low and the thermal expansion coefficient is relatively low as compared with usual soda lime glass. Further, there is such an advantage that the difference in the thermal expansion coefficient from the above array glass substrate can be controlled to be small, such being preferred.

In the case of the liquid crystal display panel in the first embodiment of the present invention, alkali-free glass is used as array glass substrate, and therefore it is possible to suppress the change in conditions under the production step of the TFT array.

Now, the liquid crystal display panel of the second embodiment of the present invention will be described.

In the liquid crystal display panel of the second embodiment of the present invention, the above array glass substrate is an alkali glass substrate as shown below, and further the above opposing glass substrate is an alkali glass substrate as shown below.

Further, the above array glass substrate and the above opposing glass substrate have different compositions.

The above array glass substrate in the second embodiment has a thermal expansion coefficient of from $75\times10^{-7}$ to $95\times10^{-7}/°$ C., preferably from $80\times10^{-7}$ to $90\times10^{-7}/°$ C.

Further, the strain point is at least 530° C., preferably at least 540° C., more preferably at least 560° C. When the strain point is such a temperature, it is possible to suppress a dimensional change due to the glass heat shrinkage in the production step of a TFT array to such an extent that no practical problem occurs, and it is thereby possible to carry out the production without any substantial change from the current production step of the TFT array.

The array glass substrate in the second embodiment essentially contains $SiO_2$ in an amount of from 50 to 75%, preferably from 50 to 70%, more preferably from 52 to 65%, based on oxide.

Further, $Al_2O_3$ is contained in an amount of from 0 to 15%, preferably from 1 to 13%, more preferably from 3 to 11%.

Further, the total content of MgO, CaO, SrO and BaO (namely, MgO+CaO+SrO+BaO) is from 6 to 24%, preferably from 11 to 23%, more preferably from 15 to 22%.

Further, the total content of $Na_2O$ and $K_2O$ (namely, $Na_2O+K_2O$) is from 6 to 24%, preferably from 8 to 20%, more preferably from 10 to 16%.

Further, MgO is contained in an amount of preferably from 0 to 10%, more preferably from 1 to 8%.

Further, CaO is contained in an amount of preferably from 0 to 15%, more preferably from 1 to 10%.

Further, SrO is contained in an amount of preferably from 0 to 15%, more preferably from 0 to 12%.

Further, BaO is contained in an amount of preferably from 0 to 15%, more preferably from 0 to 12%.

Further, ZnO is contained in an amount of preferably from 0 to 5%, more preferably from 0 to 1%.

Further, $Na_2O$ is contained in an amount of preferably from 0 to 10%, more preferably from 1 to 6%.

Further, $K_2O$ is contained in an amount of preferably from 1 to 15%, more preferably from 5 to 13%.

Further, $ZrO_2$ is contained in an amount of preferably from 0 to 7%, more preferably from 0 to 5%.

Further, the above opposing glass substrate in the second embodiment has a thermal expansion coefficient of from $50\times10^{-7}$ to $100\times10^{-7}/°$ C., preferably from $70\times10^{-7}$ to $100\times10^{-7}/°$ C., more preferably from $75\times10^{-7}$ to $95\times10^{-7}/°$ C., furthermore preferably from $80\times10^{-7}$ to $90\times10^{-7}/°$ C.

The opposing glass substrate in the second embodiment essentially contains $SiO_2$ in an amount of from 50 to 84%, preferably from 50 to 80%, more preferably from 60 to 75%, furthermore preferably from 65 to 75%, based on oxide.

Further, $Al_2O_3$ is contained in an amount of from 0 to 20%, preferably from 0 to 10%, more preferably from 0 to 8%, furthermore preferably from 0 to 5%.

Further, the total content of MgO and CaO (namely, MgO+CaO) is from 5 to 25%, preferably from 8 to 18%.

Further, the total content of $Na_2O$ and $K_2O$ (namely, $Na_2O+K_2O$) is from 1 to 25%, preferably from 5 to 25%, more preferably from 10 to 20%.

Further, MgO is contained in an amount of preferably from 0 to 10%, more preferably from 0 to 7%.

Further, CaO is contained in an amount of preferably from 1 to 25%, more preferably from 3 to 18%.

Further, $Na_2O$ is contained in an amount of preferably from 5 to 25%, more preferably from 10 to 20%.

Further, $K_2O$ is contained in an amount of preferably from 0 to 15%, more preferably from 0 to 10%.

Such an opposing glass substrate of the second embodiment may preferably be an alkali glass substrate in which the thermal expansion coefficient is from $70\times10^{-7}$ to $100\times10^{-7}/°$ C., and its composition consists essentially of, as represented by mass %, from 50 to 80% of $SiO_2$, from 0 to 10% of $Al_2O_3$, from 5 to 25% of MgO+CaO and from 5 to 25% of $Na_2O+K_2O$. Further, the difference in the thermal expansion coefficient from the above array glass substrate is preferably less than $10\times10^{-7}/°$ C. In such a case, there is such an advantage that the difference in the thermal expansion coefficient can specifically be lowered, such being preferred.

Such a liquid crystal display panel of the second embodiment of the present invention has an ability to reduce the amount of heat shrinkage of a glass substrate by adjusting conditions of the production step of a TFT array. Thus, it is possible to use not only an inexpensive glass substrate as the opposing glass substrate, but also a glass substrate more inexpensive than alkali-free glass.

Now, the liquid crystal display panel of the third embodiment of the present invention will be described.

In the liquid crystal display panel of the third embodiment of the present invention, the above array glass substrate and the above opposing glass substrate are specific alkali glass substrates having the same composition.

The thermal expansion coefficients of the above array glass substrate and the above opposing glass substrate in the third embodiment are from $75 \times 10^{-7}$ to $95 \times 10^{-7}$/° C., preferably from $80 \times 10^{-7}$ to $90 \times 10^{31\ 7}$/° C.

Further, the strain point is at least 530° C., preferably at least 540° C., more preferably at least 560° C. In the case of such a strain point, it is possible to suppress a dimensional change due to glass heat shrinkage in the production step of a TFT array to such an extent that no practical problems occur, and it is thereby possible to carry out the production without any substantial change from a current production step of the TFT array.

Further, the temperature ($T_4$) of glass melt in which the viscosity η satisfies logη=4, is $T_4 \leqq 1,200°$ C. Namely, the temperature ($T_4$) of glass melt in which the glass viscosity (η) is $10^4$ dpa·s (viscosity has an index for formability), is at most 1,200° C.

Further, $T_4$ as a temperature in which the viscosity η satisfies logη=4 means a value obtained by measurement employing a rotational viscometer.

In the third embodiment, the alkali glass substrate as the array substrate and the opposing substrate, essentially contains $SiO_2$ in an amount of from 50 to 75%, preferably from 50 to 70%, more preferably from 52 to 65%, as represented by mass % based on oxide.

Further, $Al_2O_3$ is contained in an amount of from 0 to 15%, preferably from 1 to 13%, more preferably from 3 to 11%.

Further, the total content of MgO, CaO, SrO and BaO (namely, MgO+CaO+SrO+BaO) is from 6 to 24%, preferably from 11 to 23%, more preferably from 15 to 22%.

Further, the total content of $Na_2O$ and $K_2O$ (namely, $Na_2O+K_2O$) is from 6 to 24%, preferably from 8 to 20%, more preferably from 10 to 16%.

Further, MgO is contained in an amount of preferably from 0 to 10%, more preferably from 1 to 8%.

Further, CaO is contained in an amount of preferably from 0 to 15%, more preferably from 1 to 10%.

Further, SrO is contained in an amount of preferably from 0 to 15%, more preferably from 0 to 12%.

Further, BaO is contained in an amount of preferably from 0 to 15%, more preferably from 0 to 12%.

Further, ZnO is contained in an amount of preferably from 0 to 5%, more preferably from 0 to 1%.

Further, $Na_2O$ is contained in an amount of preferably from 0 to 10%, more preferably from 1 to 6%.

Further, $K_2O$ is contained in an amount of preferably from 1 to 15%, more preferably from 5 to 13%.

Further, $ZrO_2$ is contained in an amount of preferably from 0 to 7%, more preferably from 0 to 5%.

Such an alkali glass substrate to be used for the liquid crystal display panel of the third embodiment of the present invention has a lower viscosity than the glass substrate disclosed in the above Patent Document 1, whereby such a glass substrate is more suitable for a process as a float forming method than a down-draw method. Further, it is preferred to apply a float forming method since a highly flat glass substrate can readily be produced.

In the case of such a liquid crystal display panel of the third embodiment of the present invention, the same compositional glass substrate is employed for both the array glass substrate and the opposing glass substrate, and therefore it is possible to obtain merits such as a cost reduction in manufacturing and the production stability.

Now, the form of the liquid crystal display panel of the present invention will be described.

The form of the liquid crystal display panel of the present invention is not particularly limited, and it may be a liquid crystal display panel comprising the above array glass substrate, the above opposing glass substrate opposing thereto, a liquid crystal filled between such substrate, and an ultraviolet curable resin sealing a peripheral area.

For example, FIG. 1 is a schematic cross-sectional view showing the same form as in a conventional one.

Now, FIG. 1 will be described.

FIG. 1 is a schematic cross-sectional view showing one embodiment of the liquid crystal display panel of the present invention, wherein array substrate 10 composed of array glass substrate 12 having active components 15, transparent electrode 14 and alignment film 16 on its surface and having polarizing plate 18 on its rear surface, is facing opposing substrate 20 composed of opposing glass substrate 22 having light-shielding film 25, colored film 23, transparent electrode 24 and alignment film 26 on its surface and having analyzing plate 28 on its rear surface. Further, the peripheral areas of array substrate 10 and opposing substrate 20 are sealed with sealing material 30 of an ultraviolet curable resin, and array substrate 10 and opposing substrate 20 are fixed via columnar spacers 32, and their gaps are filled with liquid crystal 34.

Further, lighting device 40 is provided on the rear surface side (the side not facing opposing substrate 20) of array substrate 10. The light device 40 has a structure in which a fluorescent lamp having light source 42 and light source cover 44 covering it, is positioned at the side, a light beam comes to the rear surface of the liquid crystal panel by virtue of light guide plate 46, and the light beam is diffused by light diffusion plate 48 and reflected by reflection plate 50 to go through the liquid crystal.

In such a liquid crystal display panel, respective components (e.g. spacer material 32, sealing material 30 and alignment film 16) constituting such a panel, may be conventional ones.

For example, spacer materials 32 are to keep the spacing between array substrate 10 and opposing substrate 20 to be an equal spacing, and are formed from e.g. a photosensitive-type resin. They may be formed on array substrate 10 and/or opposing substrate 20.

Further, sealing material 30 is e.g. an ultraviolet curable resin, and for example, one called an ultraviolet curable adhesive may usually be used.

Further, as alignment film 16, a conventional polyimide resin film may, for example, be used.

Now, the process for producing a liquid crystal display panel of the present invention will be described.

The process for producing a liquid crystal display panel of the present invention is not particularly limited, and for example, it is possible to produce the liquid crystal display panel by a conventional process.

A process for producing one having the form described with reference to FIG. 1 will be described as one example.

Firstly, a process for producing the above array substrate and the above opposing substrate of the present invention will be described.

The above array substrate is produced in such a manner that for example, firstly, by using a starting material suitably selected depending upon the type (composition) of the glass substrate to be produced, a glass substrate is produced by a known production process in which e.g. a float forming process is applied. Then, on the surface of the glass substrate produced, active components are formed by repeating usual semiconductor thin film deposition, insulating film deposition and etching by photolithography•etching process. Then, a transparent thin film made of e.g. ITO (indium tin oxide) is formed by means of a deposition method or a sputtering method, followed by applying e.g. a photolithography•etching process.

Further, the above opposing substrate is produced in such a manner that for example, firstly, a glass substrate is produced in the same manner as in the case of the above array substrate. Then, on the surface of the glass substrate produced, a chromium film is formed by means of a sputtering method, followed by applying e.g. a photolithography•etching process to form a desired light-shielding film. Then, a photosensitive colored resin dispersed with a pigment is formed and irradiated with an ultraviolet ray by using a mask, followed by development to form a colored film. Then, a transparent thin film is formed in the same manner as in the case of the above array substrate.

By means of such a process, it is possible to produce the above array substrate and the above opposing substrate of the present invention.

Then, a liquid crystal display panel is prepared by using the above array substrate and the above opposing substrate produced by such a process.

Firstly, on the periphery of a display area of the above opposing substrate, an ultraviolet ray curable sealing material is formed by a screen printing system or a lithography system. Then, a desired amount of liquid crystal is dropped on a portion surrounded by such a sealing material.

Figure 2:
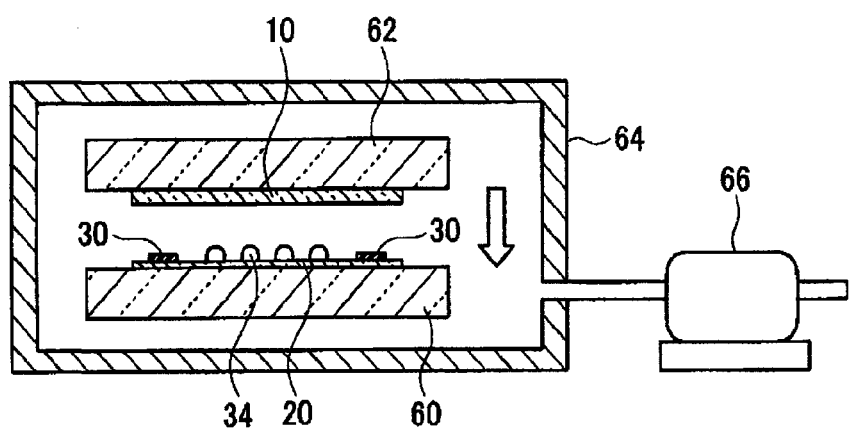
FIG. 2 is a schematic view to illustrate a production process for forming a liquid crystal by a drop-system.

Then, as shown in FIG. 2, sealing material 30 and opposing substrate 20 on which liquid crystal 34 is dropped, are fixed on lower fixed plate 60. On the other hand, array substrate 10 is fixed on upper fixed plate 62, then air in vacuum chamber 64 is discharged by vacuum pump 66 to align the positions of both substrates 10 and 20 in a vacuum state, followed by letting upper fixed plate 62 down to laminate both substrates 10 and 20 each other.

Finally, by applying ultraviolet ray from the side of opposing substrate 20, ultraviolet ray curable sealing material 30 is cured to fix both substrates 10 and 20.

Others such as a lighting device, a driving circuit and a polarizing plate are also formed by known methods.

By means of such a method, it is possible to produce the liquid crystal display panel of the present invention.

EXAMPLES

Examples 1 to 3 of the present invention will be described.

Example 1

Firstly, glass substrates having compositions shown in Table 1 and Table 2 are produced by a known production process employing a float forming method. The size and the thickness of each glass substrate are within the above preferred ranges.

Further, it is possible to obtain the content of each component contained in the glass substrate by using a chemical analysis employing e.g. an ICP atomic emission spectrometer.

Then, properties of each glass substrate are obtained. Values of such properties are shown in each Table.

Further, the thermal expansion coefficient, the strain point and $T_4$ are values obtained by measurement by the above methods.

Further, the specific gravity is a value obtained by employing a simple densimeter based on the principle of an Archimedes method.

Further, Tg (glass transition point) is a value obtained by reading the temperature at which the thermal expansion coefficient drastically changes in measurement of a thermal expansion coefficient by means of TMA.

Further, Young's modulus is a value obtained in accordance with a resonance method (JIS R1602).

Then, by employing glass substrates having compositions (mass %) in Examples 1 to 8 shown in Table 1 as glass substrates for opposing substrates and employing glass substrates having compositions (mass %) in Examples 9 to 18 shown in Table 2 as glass substrates for array substrates, liquid crystal display panels having the same form as shown in the above FIG. 1 are produced. Such a production process is the same conventional method as described above.

Liquid crystal display panels are produced from the combinations of glass substrates in Examples 1 to 8 shown in Table 1 and glass substrates in Examples 9 to 18 shown in Table 2, and the respective liquid crystal display panels are kept in a room where the temperature changes from −10 to 60° C.

As a result, for example, in a case where a combination is made so that the difference in thermal expansion coefficient between the two glass substrates exceeds $35 \times 10^{-7}/°$ C. as in a case where the glass substrate in Example 2 in Table 1 is used as a glass substrate for the opposing substrate and the glass substrate in Example 16 in Table 2 is used as the array substrate, troubles in a liquid crystal display due to panel warpage tend to occur. On the other hand, in a case where such a difference in thermal expansion coefficient is at most $35 \times 10^{-7}/°$ C., there is no trouble in a liquid crystal display due to panel warpage.

Further, the lower the difference in thermal expansion coefficient between such two glass substrates, the panel warpage will be small, but when such a difference in the thermal expansion coefficient becomes at least $10 \times 10^{-7}/°$ C., both of the weight reduction of a display and providing of an inexpensive glass substrate can be satisfied, such being preferred.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| $SiO_2$ | 71.4 | 60.6 | 79.8 | 74.2 | 75.1 | 64.7 | 69.1 | 72.3 |
| $Al_2O_3$ | 0 | 14.9 | 0 | 0.6 | 0 | 13.1 | 9.9 | 6.7 |
| MgO | 10 | 9.8 | 0 | 9.4 | 4.1 | 3.9 | 3.4 | 4 |
| CaO | 14.8 | 5.5 | 14 | 14.3 | 11.4 | 10.8 | 10.8 | 9.2 |
| $Na_2O$ | 3.8 | 7.3 | 6.2 | 1.5 | 6.3 | 6 | 6.8 | 6.1 |
| $K_2O$ | 0 | 1.9 | 0 | 0 | 3.2 | 1.5 | 0 | 1.7 |
| Total | 100 | 100 | 100 | 100 | 100 | 100 | 100 | 100 |
| Thermal expansion Coefficient ($\times 10^{-7}/°$ C.) | 68 | 75 | 62 | 60 | 73 | 70 | 67 | 66 |

TABLE 1-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Specific gravity | 2.57 | 2.53 | 2.46 | 2.53 | 2.5 | 2.5 | 2.49 | 2.47 |
| Tg(° C.) | 663 | 664 | 617 | 683 | 622 | 656 | 642 | 641 |
| $T_4$(° C.) | 1153 | 1209 | 1220 | 1227 | 1160 | 1247 | 1239 | 1239 |

TABLE 2

|  | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| $SiO_2$ | 60.0 | 60.0 | 60.8 | 57.2 | 55.3 | 57.7 | 45.0 | 62.1 | 59.7 | 56.7 |
| $Al_2O_3$ | 15.0 | 12.0 | 16.7 | 15.9 | 17.2 | 12.4 | 7.0 | 19.1 | 17.2 | 10.7 |
| $B_2O_3$ | 2.0 | 1.0 | 8.3 | 7.9 | 8.5 | 8.5 | 1.0 | 7.3 | 7.8 | 5.9 |
| MgO | 0.0 | 0.0 | 1.2 | 1.1 | 4.3 | 4.3 | 5.0 | 2.3 | 3.3 | 2.0 |
| CaO | 11.0 | 13.0 | 4.6 | 4.0 | 9.0 | 6.0 | 5.0 | 3.2 | 4.1 | 3.1 |
| SrO | 12.0 | 14.0 | 8.5 | 2.9 | 5.6 | 11.1 | 18.5 | 6.0 | 7.8 | 6.6 |
| BaO | 0.0 | 0.0 | 0.0 | 10.9 | 0.0 | 0.0 | 18.5 | 0.0 | 0.1 | 15.0 |
| Total | 100 | 100 | 100 | 100 | 100 | 100 | 100 | 100 | 100 | 100 |
| Thermal expansion Coefficient ($\times 10^{-7}$/° C.) | 52 | 56 | 35 | 41 | 44 | 47 | 77 | 32 | 38 | 49 |
| Strain point (° C.) | 685 | 690 | 660 | 670 | 651 | 638 | 650 | 690 | 665 | 635 |
| Specific gravity | — | — | 2.48 | 2.6 | 2.55 | 2.59 | 3.26 | 2.46 | 2.51 | 2.77 |

Example 2

In Example 2, a test is carried out in the same manner as in Example 1 except that a glass substrate having a composition (mass %) in Example 19 shown in Table 3 is used as a glass substrate for the opposing substrate and glass substrates having compositions (mass %) in Examples 20 to 22 shown in Table 4 are used as glass substrates for the array substrates.

As a result, in all combinations, there are no troubles in a liquid crystal display due to panel warpage.

Example 3

In Example 3, a test is carried out in the same manner as in Example 1 except that with respect to glass substrates having compositions (mass %) in Examples 20 to 22 shown in Table 4, glass substrates having the same compositions are used as the array glass substrate and the opposing glass substrate.

In each Example, there is no trouble in a liquid crystal display due to panel warpage.

TABLE 3

|  | Ex. 19 |
|---|---|
| $SiO_2$ | 73.1 |
| $Al_2O_3$ | 1.7 |
| MgO | 3.7 |
| CaO | 7.8 |
| $Na_2O$ | 13 |
| $K_2O$ | 0.7 |
| Total | 100 |
| Thermal expansion Coefficient ($\times 10^{-7}$/° C.) | 87 |
| Specific gravity | 2.49 |
| Tg(° C.) | 540 |
| $T_4$(° C.) | 1010 |

TABLE 4

|  | Ex. 20 | Ex. 21 | Ex. 22 |
|---|---|---|---|
| $SiO_2$ | 57.6 | 60.9 | 62.6 |
| $Al_2O_3$ | 7.0 | 9.5 | 4.8 |

TABLE 4-continued

|  | Ex. 20 | Ex. 21 | Ex. 22 |
|---|---|---|---|
| MgO | 2.0 | 5.0 | 4.9 |
| CaO | 5.0 | 6.1 | 7.3 |
| SrO | 7.0 | 1.6 | 3.2 |
| BaO | 8.0 | 0.0 | 0.0 |
| $Na_2O$ | 4.1 | 4.9 | 2.4 |
| $K_2O$ | 6.3 | 9.5 | 12.8 |
| $ZrO_2$ | 3.0 | 2.5 | 1.9 |
| Total | 100 | 100 | 100 |
| Thermal expansion Coefficient ($\times 10^{-7}$/° C.) | 83 | 83 | 83 |
| Specific gravity | 2.77 | 2.55 | 2.56 |
| Strain point (° C.) | 570 | 590 | 586 |
| Young's modulus (GPa) | 76 | 76 | 75 |
| $T_4$(° C.) | 1140 | 1180 | 1150 |

INDUSTRIAL APPLICABILITY

It is possible to produce the liquid crystal display panel of the present invention at low cost, and it is not necessary to conduct heat treatment during or after the step of laminating an array substrate with an opposing substrate by an ultraviolet curable resin, whereby there will be no troubles in a liquid crystal display due to panel warpage, and there will be no panel warpage which tends to bring a trouble in a liquid crystal display derived from a change in the ambient temperature at the time of use, such being extremely useful.

The entire disclosure of Japanese Patent Application No. 2006-181342 filed on Jun. 30, 2006 including specification, claims, drawings and summary is incorporated herein by reference in its entirety.

What is claimed is:

1. A liquid crystal display panel comprising an array glass substrate and an opposing glass substrate facing it, in which a liquid crystal is filled between such substrates, and an ultraviolet curable resin is sealed at a peripheral area, wherein the above opposing glass substrate is an alkali glass substrate, the array glass substrate is an alkali-free glass, the difference in thermal expansion coefficient between the above array glass substrate and the above opposing glass substrate is from $10\times10^{-7}/°$ C. to $30\times10^{-7}/°$ C., the array glass substrate has a thermal expansion coefficient of from $30\times10^{-7}/°$ C. to $80\times10^{-7}/°$ C., and its composition consists essentially of, as represented by mass% based on oxide, from 45 to 70% of $SiO_2$, from 5 to 25% of $Al_2O_3$, from 6 to 12% of $B_2O_3$, from 1 to 7% of MgO, from 2 to 14% of CaO, from 0 to 15% of SrO and from 0 to 1% of BaO; and the opposing glass substrate has a thermal expansion coefficient of from $50\times10^{-7}/°$ C. to $100\times10^{-7}/°$ C., and its composition consists essentially of, as represented by mass% based on oxide, from 60 to 84% of $SiO_2$, from 0 to 20% of $Al_2O_3$, from 0 to 15% of MgO, from 5 to 25% of CaO, from 1 to 12% of $Na_2O$, from 0 to 8% of $K_2O$ and from 1 to 13% of $Na_2O+K_2O$.

2. The liquid crystal display panel according to claim 1, wherein the above difference in thermal expansion coefficient is at most $20\times10^{-7}/°$ C.

3. The liquid crystal display panel according to claim 1, wherein the opposing glass substrate has a thermal expansion coefficient of from $50\times10^{-7}/°$ C. to $80\times10^{-7}/°$ C.

4. The liquid crystal display panel according to claim 1, wherein the opposing glass substrate has a thermal expansion coefficient of from $60\times10^{-7}/°$ C. to $70\times10^{31\ 7}/°$ C.

5. The liquid crystal display panel according to claim 1, wherein the array glass substrate has a thermal expansion coefficient of from $35\times10^{-7}/°$ C. to $55\times10^{-7}/°$ C.

6. The liquid crystal display panel according to claim 1, wherein the array glass substrate has a strain point of at least 630° C.

7. A liquid crystal display panel comprising an array glass substrate and an opposing glass substrate facing it, in which a liquid crystal is filled between such substrates, and an ultraviolet curable resin is sealed at a peripheral area, wherein the difference in thermal expansion coefficient between the above array glass substrate and the above opposing glass substrate is at most $20\times10^{-7}/°$ C., the array glass substrate has a thermal expansion coefficient of from $75\times10^{-7}/°$ C. to $95\times10^{-7}/°$ C. and a strain point of at least 530° C., and its composition consists essentially of, as represented by mass% based on oxide, from 57.6 to 62.6% of $SiO_2$, from 4.8 to 9.5% of $Al_2O_3$, from 12.7 to 22% of MgO+CaO+SrO+BaO, from 10.4 to 15.2% of $Na_2O+K_2O$, and from 1.9 to 3% of $ZrO_2$; and the opposing glass substrate has a thermal expansion coefficient of from $50\times10^{-7}/°$ C. to $100\times10^{-7}/°$ C., and its composition consists essentially of, as represented by mass% based on oxide, from 50 to 84% of $SiO_2$, from 0 to 20% of $Al_2O_3$, from 5 to 25% of MgO+CaO, from 10 to 25% of $Na_2O+K_2O$, and at least 10% $Na_2O$.

8. The liquid crystal display panel according to claim 7, wherein the opposing glass substrate has a thermal expansion coefficient of from $80\times10^{-7}/°$ C. to $90\times10^{-7}/°$ C.

9. The liquid crystal display panel according to claim 7, wherein the array glass substrate has a thermal expansion coefficient of from $80\times10^{-7}/°$ C. to $90\times10^{-7}/°$ C.

10. The liquid crystal display panel according to claim 7, wherein the array glass substrate has a strain point of at least 560° C.

11. A liquid crystal display panel comprising an array glass substrate and an opposing glass substrate facing it, in which a liquid crystal is filled between such substrates, and an ultraviolet curable resin is sealed at a peripheral area, wherein the difference in thermal expansion coefficient between the above array glass substrate and the above opposing glass substrate is at most $2033\ 10^{-7}/°$ C., the array glass substrate and the opposing glass substrate are glass substrates having the same composition, the glass substrates have a thermal expansion coefficient of from $75\times10^{-7}/°$ C. to $95\times10^{-7}/°$ C. and the strain point of at least 530° C., the temperature ($T_4$) of glass melt at which the viscosity η satisfies log η=4 is $T_4\leq1200°$ C., and its composition consists essentially of as represented by mass% based on oxide, from 57.6 to 62.6% of $SiO_2$, from 4.8 to 9.5% of $Al_2O_3$, from 15.4 to 22% of MgO+CaO+SrO+BaO and from 10.4 to 15.2% of $Na_2O+K_2O$.

12. The liquid crystal display panel according to claim 11, wherein the opposing glass substrate and the array glass substrate have a thermal expansion coefficient of from $80\times10^{-7}/°$ C. to $90\times10^{-7}/°$ C.

13. The liquid crystal display panel according to claim 11, wherein the array glass substrate has a strain point of at least 560° C.

* * * * *